United States Patent [19]

Watanabe

[11] Patent Number: 5,587,762
[45] Date of Patent: Dec. 24, 1996

[54] AUTOMATIC FOCUSING DEVICE

[75] Inventor: Toshimi Watanabe, Kanagawa-ken, Japan

[73] Assignee: Nikon Corporation, Tokyo, Japan

[21] Appl. No.: 512,981

[22] Filed: Aug. 9, 1995

[30] Foreign Application Priority Data

Sep. 7, 1994 [JP] Japan ................... 6-213400

[51] Int. Cl.$^6$ ................... G03B 13/36
[52] U.S. Cl. ................... 396/95
[58] Field of Search ................... 354/402, 406, 354/407, 408; 250/201.2, 201.7, 201.8

[56] References Cited

U.S. PATENT DOCUMENTS

| | | | |
|---|---|---|---|
| 4,908,645 | 3/1990 | Higashihara et al. | 354/402 |
| 4,980,715 | 12/1990 | Utagawa | 354/402 |
| 5,012,267 | 4/1991 | Higashihara | 354/402 |
| 5,239,332 | 8/1993 | Muramatsu et al. | 354/402 |

*Primary Examiner*—W. B. Perkey
*Attorney, Agent, or Firm*—Oliff & Berridge

[57] ABSTRACT

An automatic focusing device of the present invention forecasts the future position of the photographic object accurately. The device includes an object focusing position change velocity calculation device, which calculates the object focusing position change velocity of the object, and an object focusing position change velocity ratio calculation device, which calculates the ratio of the object focusing position change velocity as sequentially calculated by the object focusing position change velocity calculation device. An object focusing position change acceleration calculation device calculates the object focusing position change acceleration from the object focusing position change velocity calculation device, and the forecast means forecasts the movement of the future object. A revision device revises the acceleration calculated by the object focusing position change acceleration calculation device according to the velocity ratio calculated by the object focusing position change velocity ratio calculation device. The forecast device is controlled based on this revised object focusing position change acceleration.

23 Claims, 11 Drawing Sheets

AUTOMATIC FOCUSING DEVICE

BACKGROUND OF THE INVENTION

1. Field of the Invention

This invention relates to an automatic focusing device that makes measurement of a future object position possible and drives the lens accordingly.

2. Description of Related Art

In the prior art, automatic focusing devices forecasted the future object position by an approximate first order formula (hereafter referred to as a linear function forecast) and calculated the image plane movement velocity from the past to the present defocus amount, the time interval between the two, and the lens movement amount. Known automatic focusing devices forecast the future position of the object by using a quadratic function (hereafter referred to as a quadratic function forecast) from the last three defocus amounts, the time interval of the focus detection, and the lens movement amount during the appropriate time interval.

Even when it is assumed that the object is moving at a uniform velocity, the change in the object position does not occur at a uniform velocity. Because it is assumed that the image plane movement velocity in previous linear function forecasts is uniform, depending upon the disparity from the most recent point of detection time and a future point of time, a large error occurs. For example, in FIG. 1, the object detection position at a previous detection point is P1 at the time of the previous detection T1. The future object position PT at the future point of time TT is forecast from the time of the present detection time T0 of the object detection position P0. As the time difference between the present time T0 and the future time TT increases, the larger the error that will occur, as shown in FIG. 1. When calculating the forecast position of the object at point of time TT by way of a linear function forecast, the position of PT is (erroneously) forecast. Because the actual object is in the PTR position, an error of the magnitude ER occurs.

In addition, because the future position will be forecast by way of an approximate quadratic function from the last three object positions, a large error occurs in the quadratic function forecast due to detection errors and other factors. For example, FIG. 2 shows the quadratic function forecast case where the object position changes from P2, at the first previous detection point of time T2, to P1, at the second previous detection point of time T1, and to P0, at the present detection time T0. In this case, since the detected focal point includes an error, a forecast curve similar to that of FIG. 1 is erroneously forecast and a large error occurs in the future time TT. In other words, when calculating the forecast position of the object at the future time TT by means of a quadratic function forecast, the position PT is erroneously forecast. Because the actual object is in the PTR position, an error of the magnitude ER occurs. Additionally, in the case where the object approaches uniform speed, because the image plane position becomes a hyperbolic function, it cannot be accurately approximated by a quadratic function.

SUMMARY OF THE INVENTION

In order to overcome at least the aforementioned problems, the present invention includes the features explained below. An automatic focusing device according to this invention provides a focus detection device that detects the focal adjustment state of a photographic lens and a monitor that monitors the movement of the photographic lens. An object focusing position change velocity calculation device is provided that sequentially calculates the object focusing position change velocity based upon the monitor results and the detection results of the focus detection device. An object focusing position change velocity ratio calculation device calculates the ratio of the two object focusing position change velocities as output by the object focusing position change velocity calculation device. An object focusing position change acceleration calculation device calculates the object focusing position change acceleration from the object focusing position change velocity. A forecast device forecasts the future movement of the object being provided in the automatic focusing device. Additionally, a revision device revises the acceleration calculated by the object focusing position change acceleration calculation device according to the velocity ratio output by the object focusing position change velocity ratio calculation device. A control device controls the forecast device based on the object focusing position change acceleration revised by this revision device.

In one embodiment of the present invention, the automatic focusing device prohibits the revision device from revising the calculated acceleration in the case when the object focusing position change velocity falls below a prescribed value.

In another embodiment of the invention, the automatic focusing device prohibits the revision device from revising the calculated acceleration when the image plane velocity falls below a prescribed value.

The automatic focusing device can also prohibit the revision device from revising the calculated acceleration in the case when the object focusing position change velocity ratio exceeds a prescribed value.

A further aspect of the invention includes a forecast device that derives, by way of a quadratic function, the object position after a prescribed time. An object focusing position change velocity ratio calculation device calculates the ratio of the two object focusing position change velocities, and sequentially calculates the object focusing position change velocity from the monitor results and the detection results. A revision device revises the quadratic coefficient of the quadratic function using the forecast device according to the velocity ratio of the object focusing position change velocity ratio calculation device.

DETAILED DESCRIPTION OF PREFERRED EMBODIMENTS

The automatic focusing device of this invention is able to effectively calculate future object positions. First, the device calculates the object focusing position change velocity of the present time and the previous time and calculates the acceleration component from the difference of the object focusing position change velocities. A forecasting device forecasts the future acceleration component by multiplying the ratio of the object focusing position change velocity of the previous time to the present time by the acceleration component. It is then possible to forecast the future object position based upon the forecast acceleration component and the object focusing position change velocity.

Through this method, the automatic focusing device does not depend on the focal length of the photographic lens. Because the present invention forecasts the future acceleration component using the ratio of the object position (depending upon the relationship between the object and the camera position) and the velocity of the object, the future image position can be forecast accurately.

In addition, when the object focusing position change velocity and the image plane velocity are smaller than a prescribed value, a revision device is prohibited from revising the calculated acceleration because the error of the object focusing position change acceleration becomes larger.

An explanation is provided hereafter of a preferred embodiment of the present invention.

Figure 4:
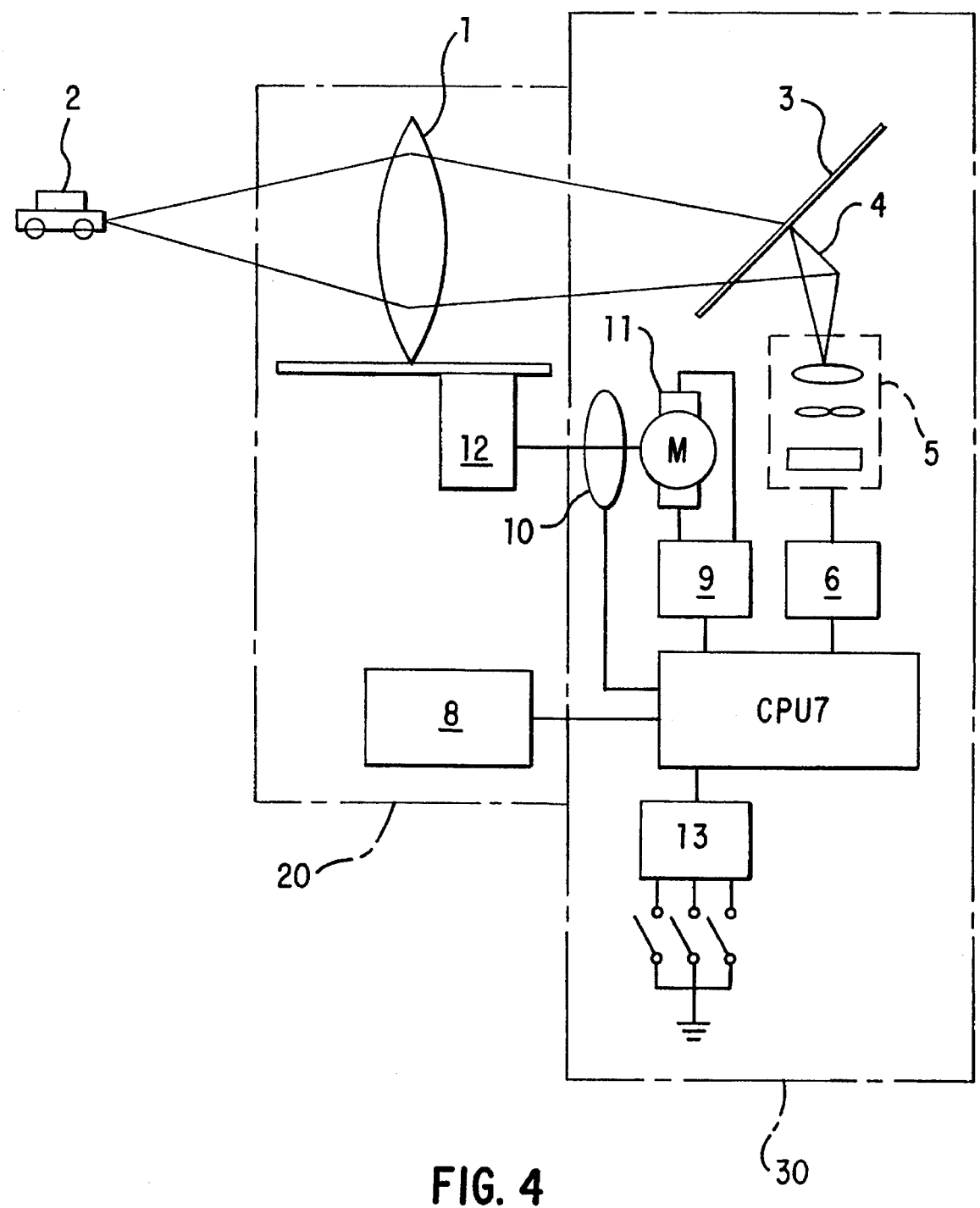
FIG. 4 illustrates a camera structure using the present invention.

FIG. 4 is a block diagram of a camera system used with the present invention. This camera system is constructed from a lens barrel and camera body. The block 20 on the left side of FIG. 4 shows the structural components of the lens barrel. The block 30 on the right side of FIG. 4 shows the structural components of the camera body. A portion of the light that passes through a photographic lens 1, from an object 2, is directed by a main mirror 3 and a sub-mirror 4 to an AF (auto-focus) module 5. At AF module 5 the light is converted into an electric signal showing the focusing state of photographic lens 1. AF module 5 is structured from a reimaging optical system and a sensor by means of a well-known focus detection device and is controlled by a sensor drive circuit 6. The electric signal showing the focusing state converted to the electric signal is A/D converted at the CPU 7 and stored in the memory of a CPU 7. A lens information storage circuit 8 stores appropriate information such as the focal length of photographic lens 1, the defocus amount-lens drive amount conversion coefficient and the like. The lens drive amount is calculated based on the data stored in the CPU 7 and the data of the defocus amount-lens drive amount conversion coefficient stored in the lens information storage circuit 8. The CPU 7, based upon this lens drive amount, controls the drive of a motor control circuit 9. The lens drive amount or the lens 1 position during monitoring is determined and implemented by an encoder 10 and a motor 11. The drive power from motor 11 is transferred to a lens movement mechanism 12 that performs the focusing. Operating assembly 13 components are constructed from multiple switches, the operating member 13 components being constructed of, among other things, SW1 (hereafter called the half-press switch), which is turned "on" by the first stroke of the half-press button, and SW2 (hereafter called full-press switch), which is turned "on" by the second stroke.

In the illustrated embodiment, the autofocus controller 7 is preferably implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flow charts shown in FIGS. 5, 6, 8, 10, 12 and 15 can be used as the controller. As shown, a distributed processing architecture is preferred for maximum data/signal processing capability and speed.

These controls are realized through the software in the CPU 7, an explanation of the routine of the software being provided based on the flow charts.

Figure 3:
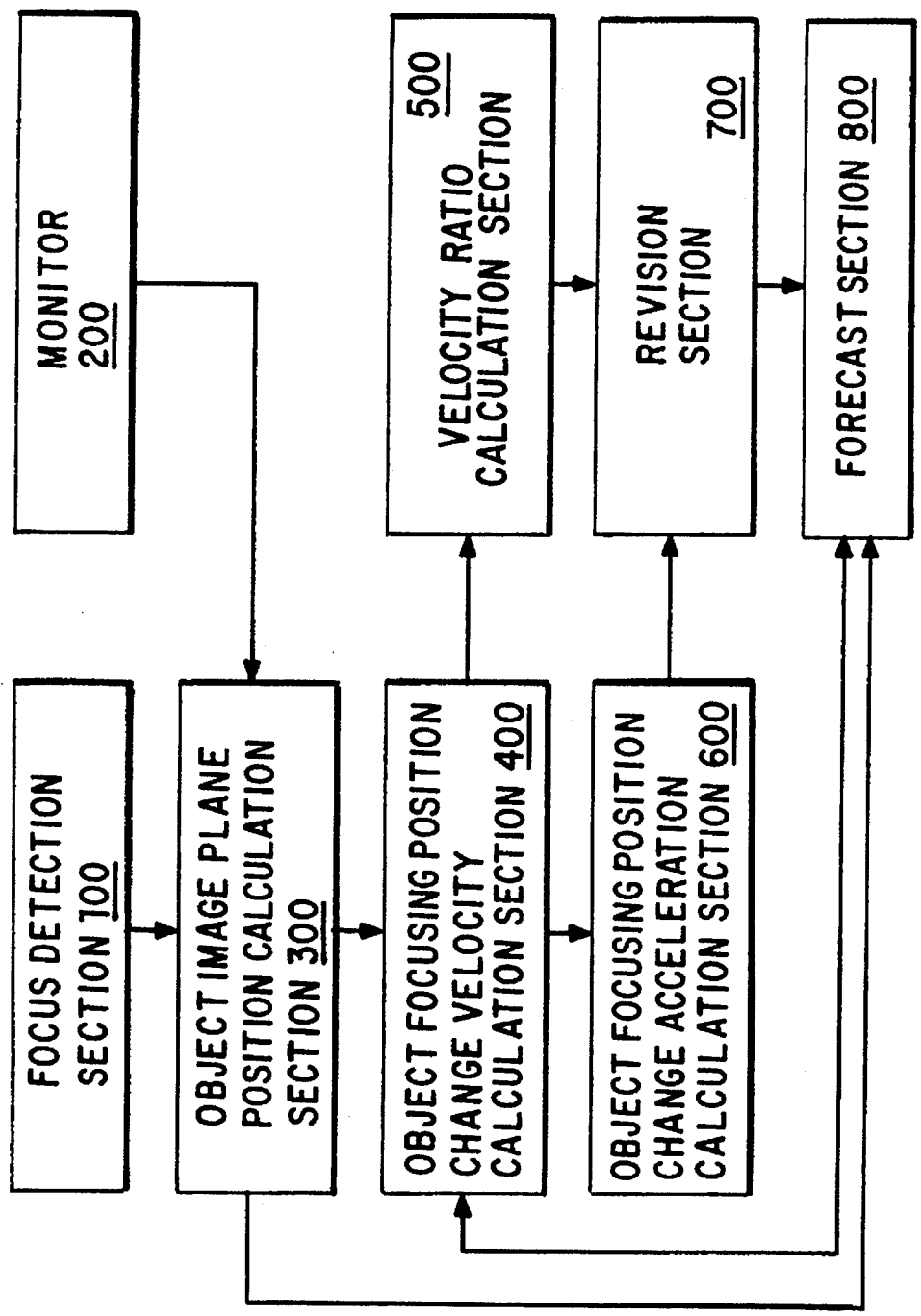
FIG. 3 is a schematic diagram of the components according to the present invention.

Additionally, FIG. 3 illustrates the various sections of the controller and the data flow between the sections. As shown, the focus detection data from the focus state detection section 100 and monitor data from monitor 200 are sent to the object image plane calculation section 300. From the object image plane calculation section 300, data is sent to both the forecast section and the object focusing position change velocity calculation section 400. The object focusing position change velocity calculation section 400 calculates the velocity based on previous and/or current position data. After two velocities have been calculated, velocity ratio calculation section 500 determines the ratio of a first velocity to a second velocity. The object focusing position change acceleration calculation section 600 calculates acceleration based on at least two of the velocities calculated by the section 400. Both the velocity ratio and the acceleration data are sent to revision section 700 for consideration. The results from the revision section, the object image plane position calculation section, and the object focusing position change velocity calculation section are sent to forecast section 800 for consideration.

Figure 5:
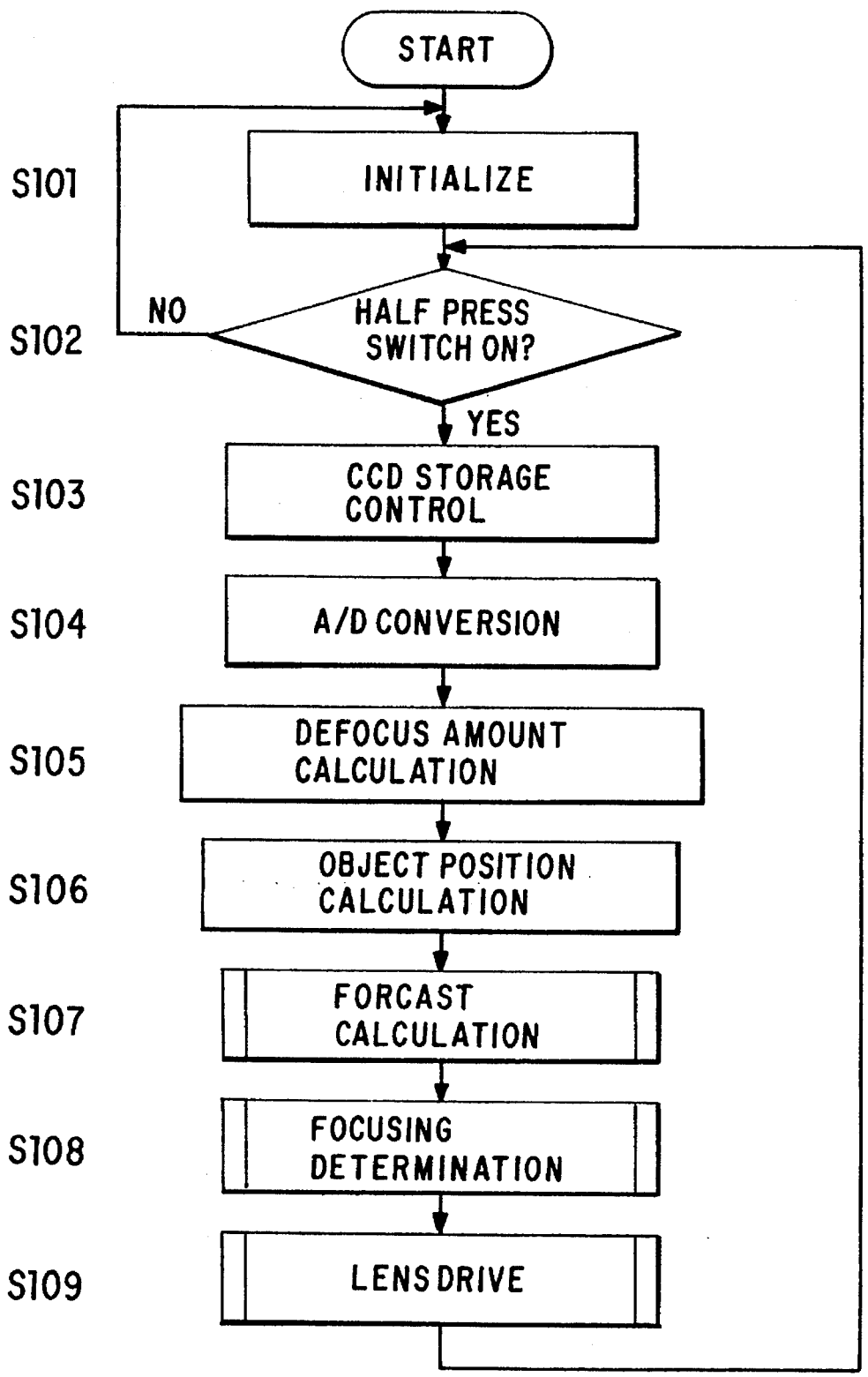
FIG. 5 is the main flow chart for the control assembly 7.

FIG. 5 is the main flow chart of the CPU 7 of the present embodiment. An explanation of the invention based on this flow chart follows.

The initialization of the memory and flags used is performed at S101. Examples of variables that are initialized are the defocus amount, the storage center time, the object movement flag, and focusing flags that were detected in the past.

At S102 a test is performed to determine whether the half-press switch is "on". If not "on", the program proceeds to S101, and if "on", then the program proceeds to S103.

S103 is the sub-routine of storage control during which data is stored into the memory. In the sub-routine of the storage control, the control of the initiating and completion of the CCD storage is performed. In addition, in order to calculate the average lens position LPO during storage, the average lens position LPO is derived by integrating the feedback pulse from the encoder 11 of the circuit 8 from initiation to completion. In order to obtain lens information (defocus amount-lens drive amount conversion coefficient) of the median storage time T0, the lens transmission initiates at the time T0. In this instance, the lens side is configured to send the lens information at the time of lens transmission initiation.

At S104, the A/D converter converts the analog signal that has been photoelectrically converted by the sub routine of the storage control, and holds the memory (installed) in the CPU 7.

S105 is the sub-routine of the defocus amount calculation. Here, the defocus amount DF0 based on the photoelectric conversion signal contained in the memory is calculated.

At S106, the lens movement amount is calculated. The amount is calculated using the average lens position LPO during storage based on the defocus amount-lens drive amount conversion coefficient LD0 (KL, L) obtained from the defocus amount DF0 and the medium storage time calculated at S105. Additionally, object target position P0 of the median storage time T0 is calculated. First, conversion is accomplished of the defocus amount DF0 to the lens movement amount DP0 of the feedback pulse calculation. At this point, calculation is accomplished as shown in formula (1) using the two coefficients KL, L of the defocus amount-lens movement amount conversion coefficients obtained from the present median storage time, and the lens movement amount pulse conversion coefficient KB (a fixed amount in the body).

$$DP0 = KB \times KL \times DF0/(1 - L \times DF0) \quad (1)$$

The defocus amount DF0 obtained by the present focus detection corresponds to the defocus amount of the average lens position during present storage. Therefore, the object target position P0 is calculated as in formula (2).

$$P0 = DP0 + LP0 \quad (2)$$

In order to accurately calculate the object target position P0, the defocus amount-lens movement amount conversion coefficient of the average lens position LPO during storage is necessary. To simplify the explanation in this embodiment, it is assumed that the difference is small between the defocus amount-lens movement amount conversion coefficient obtained by the median storage time and the defocus amount-lens movement amount conversion coefficient of the average lens position during storage.

In S107, the future movement of the object based on the stored past focus detection information (defocus amount, the average lens position, and the median storage time) and the defocus amount calculated at the sub-routine of the defocus amount calculation is predicted.

At S108, the determination is made as to whether focusing is presently occurring or not.

At S109, the necessary control amount in order to perform the actual lens drive is calculated.

Next, a detailed explanation of each sub-routine will be provided.

Figure 6:
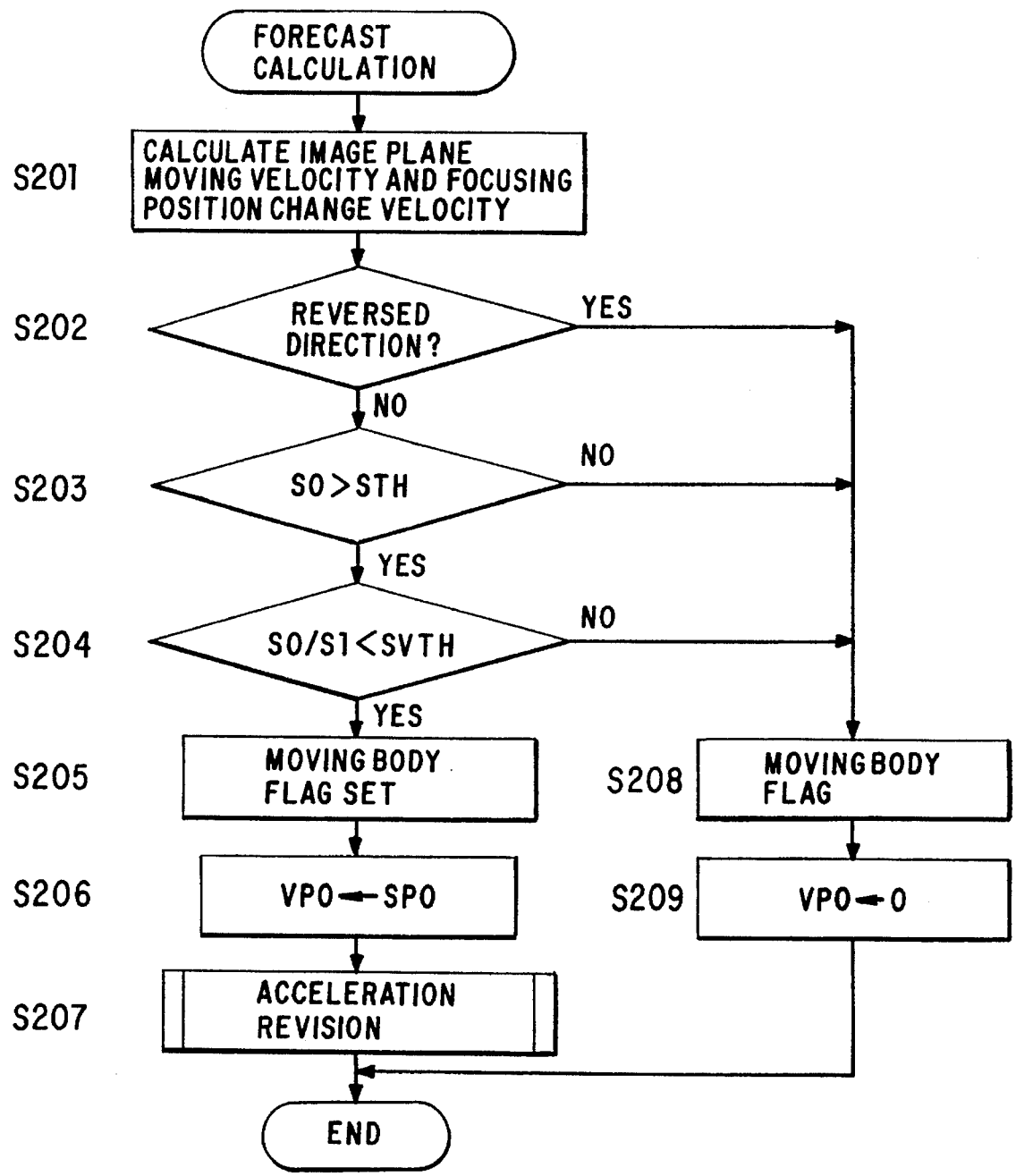
FIG. 6 is a flow chart of the subroutine used for forecast calculation.

An explanation of the forecast calculation subroutine of S107 of FIG. 5 is provided with reference to FIG. 6. At S201 the image plane movement velocity and the object focusing position change velocity occurring due to the movement of the object when supposing a fixed position of the lens are calculated. The determination of image plane movement velocity uses the moving body determination, and the determination of object focusing position change velocity uses the lens movement control. The methods for determining the image movement velocity and focus position change velocity will be explained hereafter based on FIG. 7.

The defocus amount is the relative position as seen from the predetermined or desired imaging plane (i.e., to film plane or equivalent conjugate plane of the film plane) to the imaging plane of the object. Additionally, the relationship of the change of defocus due to the movement of the lens generally cannot be determined to be a proportional relationship as it differs depending on the position of the lens. Therefore, the defocus amount for the different lens positions cannot be accounted for in the calculation. In order to calculate the one-time image plane velocity, calculation is accomplished of the relative value DP1C of the object position of the previous median storage time as seen from the lens position of the present median storage time, as shown in formula (3).

$$DP1C = P1 - LP0 \quad (3)$$

Here P1 is the previous object target position and LPO is the average lens position.

Next, the relative value DP1C is converted to the corresponding defocus amount DF1C using the defocus amount-lens drive amount conversion coefficient obtained from the present median storage time.

$$DF1C = DP1C/(KB \times KL + DP1C \times L) \quad (4)$$

Next, the image plane movement velocity is derived from the time interval as seen from the present defocus amount DF0 and the present median storage time lens position to the defocus amount DF1C of the median storage time, as shown in formula (5).

$$S0 = (DF0 - DF1C)/(T0 - T1) \quad (5)$$

Figure 7:
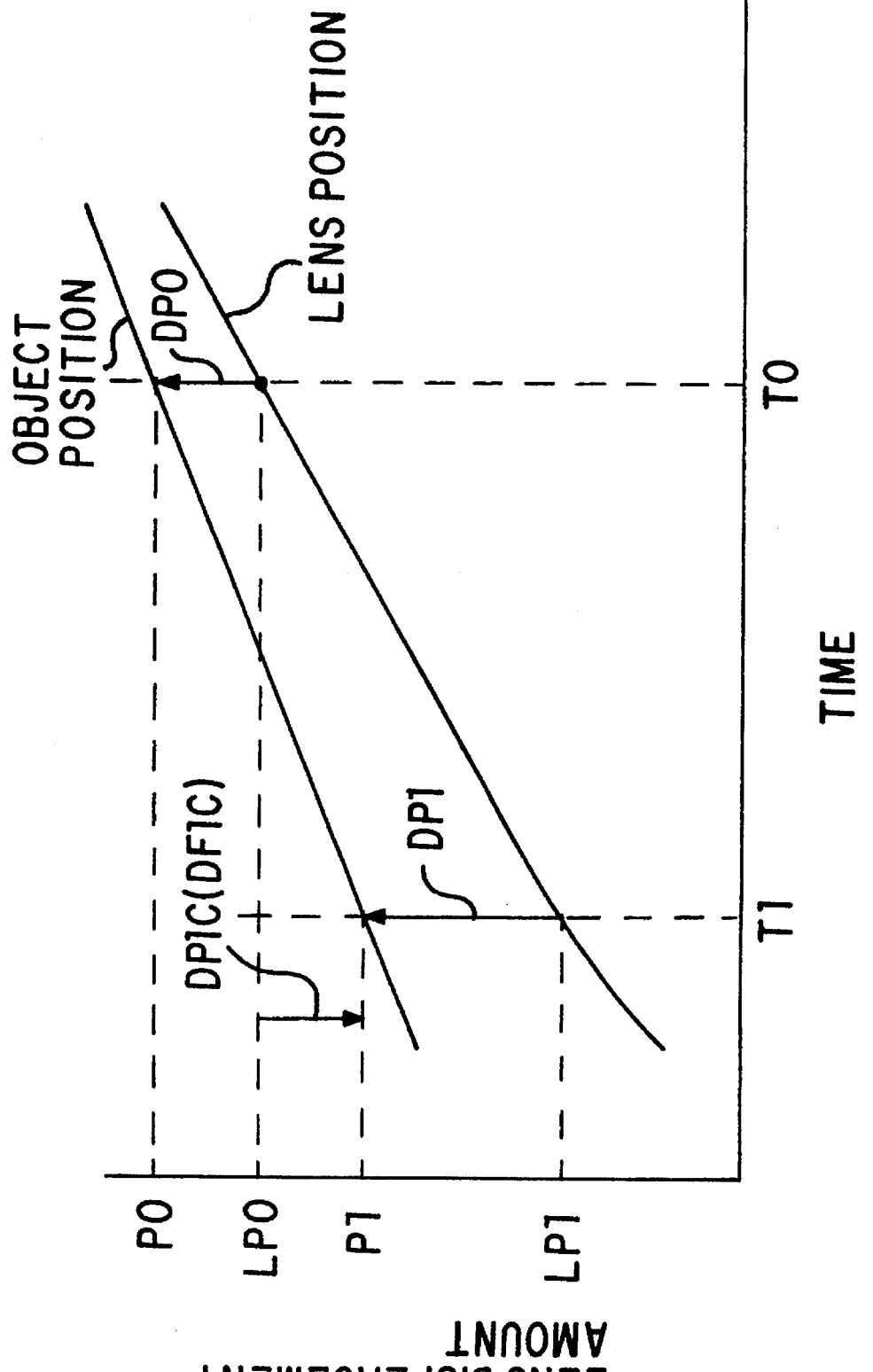
FIG. 7 is a graph illustrating the calculation method of the image plane moving velocity.

Next, an explanation of the calculation method of the object focusing position change velocity based on FIG. 7 is provided. The object focusing position change velocity SP0, which is the change amount of the focusing lens position corresponding to the time unit from the time interval between the lens position P1 that was focusing on the object of the present median storage time T1, to the lens position P0 that was focusing on the object of the present median storage time T0 is calculated according to formula (6).

$$SP0 = (P0 - P1)/(T0 - T1) \quad (6)$$

This embodiment uses the focus detection results of both the current and the previous times to calculate the image plane movement velocity and the object focusing position change velocity, but it is not always necessary to use these two detection results. The results of the present time and prior-previous time may also be used. In addition, it is also possible to calculate the time interval between the time T0 and the time T1 using past focus detection data that have a longer prescribed time.

At S202 in FIG. 6 the directions of the presently calculated image plane movement velocity S0 and the previously calculated image plane movement velocity are compared. If the directions are reversed, because (1) the object is away from the focus detection area, (2) a different object is detected and movement direction is reversed, or, (3) the object is inappropriate for forecast calculation, the program proceeds to S208, without recognition of the moving body. S203 tests whether the present image plane movement velocity S0 is above a prescribed value Sth. If the value of the image plane movement velocity is below the prescribed value Sth, the object is determined not to be the moving body, and the program proceeds to S208.

At S204, the position change ratio calculation section calculates the ratio (S0/S1) of the present image movement velocity S0 to the previous image plane movement velocity S1 and tests whether this ratio is within the prescribed boundary. If the ratio is within the prescribed boundary, the results of the present focus detection can be trusted. Therefore, the program proceeds to S205 when the determination is made that a moving body is detected. In cases where the ratio is outside the prescribed boundary, because the object is away from the focus detection area, it is presumed that a different object is detected. Thus, a determination is made that the object is not a moving body, and the program proceeds to S208.

As described above, at S205 a determination of a present moving body can be made and a moving body flag set.

At S206, SP0 is substituted in place of the lens movement target velocity VP0 for the lens control.

In S207, the acceleration revision device may be operated. When a moving body object is detected, the time change of the object focusing position change velocity is revised, and the object focusing position change velocity for maximization to a time after the prescribed time is revised. This acceleration revision sub-routine will be explained based on FIG. 8 and FIG. 9.

Figure 9:
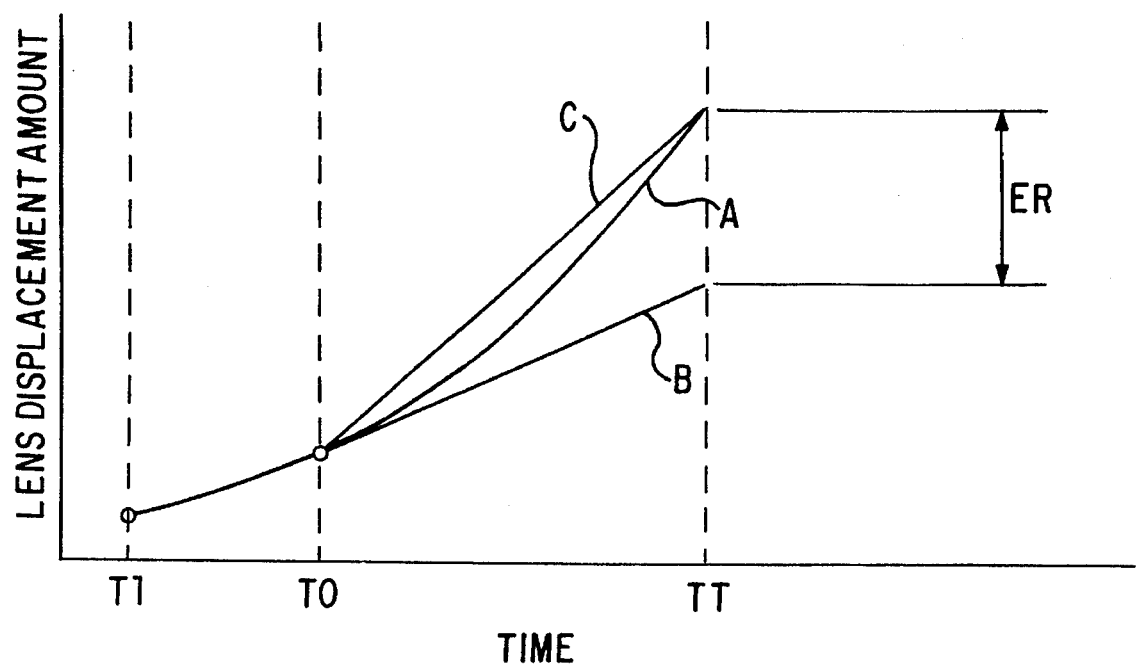
FIG. 9 is a graph illustrating the acceleration revision.

FIG. 9 explains the case where (curve A) the object focusing position changes to a function above the quadratic, like a high order function, due to the movement of the object. In the case where the future position is forecast by only the object focusing position change velocity SP0 calculated by S201, an object focusing position such as the straight line B in FIG. 9 is forecast. In actuality, because the true curve changes like curve A, an error ER occurs at time TT. Therefore, when the time between time T0 to the time TT assumes the velocity changes to be fixed, the velocity or the position of time TT as derived by the velocity change from time T0 to time TT can be forecast. Derivation of the acceleration component is accomplished employing the past object target position. In this embodiment, the object focusing position change acceleration AP is calculated from the present and previous object focusing position change velocities, and by additionally multiplying the object focusing position change acceleration AP by the ratio of the object focusing position change velocities. Thus, an acceleration component for a time following time T0 is forecast.

Figure 8:
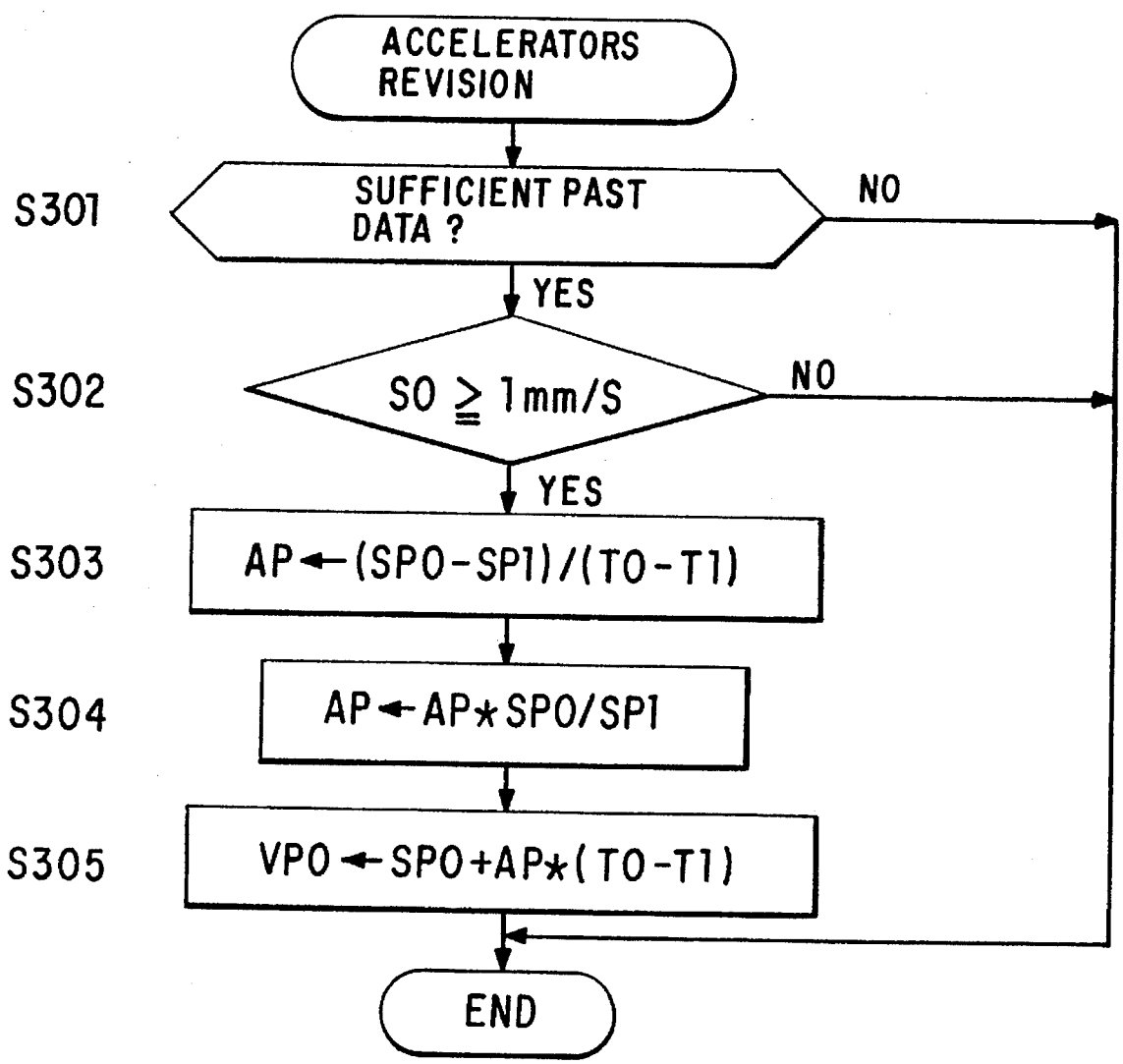
FIG. 8 is the flow chart of the subroutine used for acceleration revision.

Hereafter, an explanation is provided following the flow chart of FIG. 8. In S301, in order to perform the acceleration revision, testing is accomplished to determine whether the necessary data is stored or not. In the case when data is stored, the program proceeds to S302, and, when it is not stored, the acceleration component cannot be calculated. If the acceleration component cannot be calculated, the sub-routine of acceleration revision is completed.

S302 tests whether the image plane movement velocity S0 calculated at S201 is above a predetermined value, such as 1 mm/s, or not. In the case where the image plane movement velocity is above 1mm/s, the program proceeds to S303 and performs acceleration revision. When the image plane movement velocity is small, a large error occurs in the object focusing position change acceleration due to the detection errors etc. Therefore, the acceleration revision cannot be performed.

Here, for comparison, the image plane movement velocity is 1 mm/s. However, this value may vary.

At S303, the object focusing position change acceleration calculation device calculates the object focusing position change acceleration from the previous object focusing position change velocity SP1 and the present object focusing position change velocity SP0 according to the following formula (7).

$$AP=(SP0-SP1)/(T0-T1) \quad (7)$$

The present object focusing position change acceleration used at S303 is derived from the previous and present object target position. Therefore, the average velocity from the time T1 to time T0 is shown. However, this embodiment instead uses only the velocity at the time T0. Therefore, the point of time of the object focusing position change velocity SP0 can be presumed to show the velocity at the median point of time of time T1 and time T0. When the object focusing position change acceleration is derived accurately, it is additionally better to take the average point of time of the object target position using the object focusing position change velocity calculation for each time in the denominator of formula (7). The object focusing position change acceleration AP calculated at S303 shows the average acceleration from time T1 to time T0.

The forecast device forecasts the future object focusing position change velocity at S304 by multiplying the object focusing position change acceleration AP calculated at S303 by the object focusing position change velocity ratio, calculation being accomplished in accordance with the following formula (8).

$$AP=AP\times(SP0/SP1) \quad (8)$$

The revision device revises the lens movement target velocity VP0 of the present median storage time T0 at S305 to the added lens movement target velocity VP0. The lens movement control in this embodiment is applied to lens-drive based upon the focusing position at a certain time and the lens movement target velocity at that point of time. Therefore, by revising the control position change velocity VP0 similar to curve C in FIG. 9, the revision of the acceleration portion is performed. In other words, when the change of the focus position in a time following the time T0 is assumed to be the acceleration, CPU 7 revises the lens drive target velocity to ensure the unity of the quadratic curve of the focus position change at time TT, and the straight line for the lens control. The time TT in this embodiment is twice the time following time T0 to the focus detection time interval. It is not always necessary to treat the point of time TT in this manner. It is also acceptable to make the time of the released time lag be the added time. The revision formula of the lens movement target velocity is shown in the following formula (9).

$$VP=SP0+AP\times(TT-T0)/2 \quad (9)$$

Since this embodiment takes the time TT from time T0 to a time that is twice that of the focus detection time interval, it corresponds to the following formula (10).

$$VP0=SP0+AP\times(T0-T1) \quad (10)$$

When the revised lens movement target velocity VP0 is calculated, the sub-routine of the acceleration revision of S207 is completed. Since the change velocity of the object target position and the change acceleration are derived, the object target position of the time TT is directly calculated. The lens can be driven to the object target position.

Returning to the flow chart in FIG. 6, S208 clears the moving body flag because of a still object or when the present moving body cannot be determined. S209 sets the lens movement target velocity VP0 for the lens control to 0.

Figure 10:
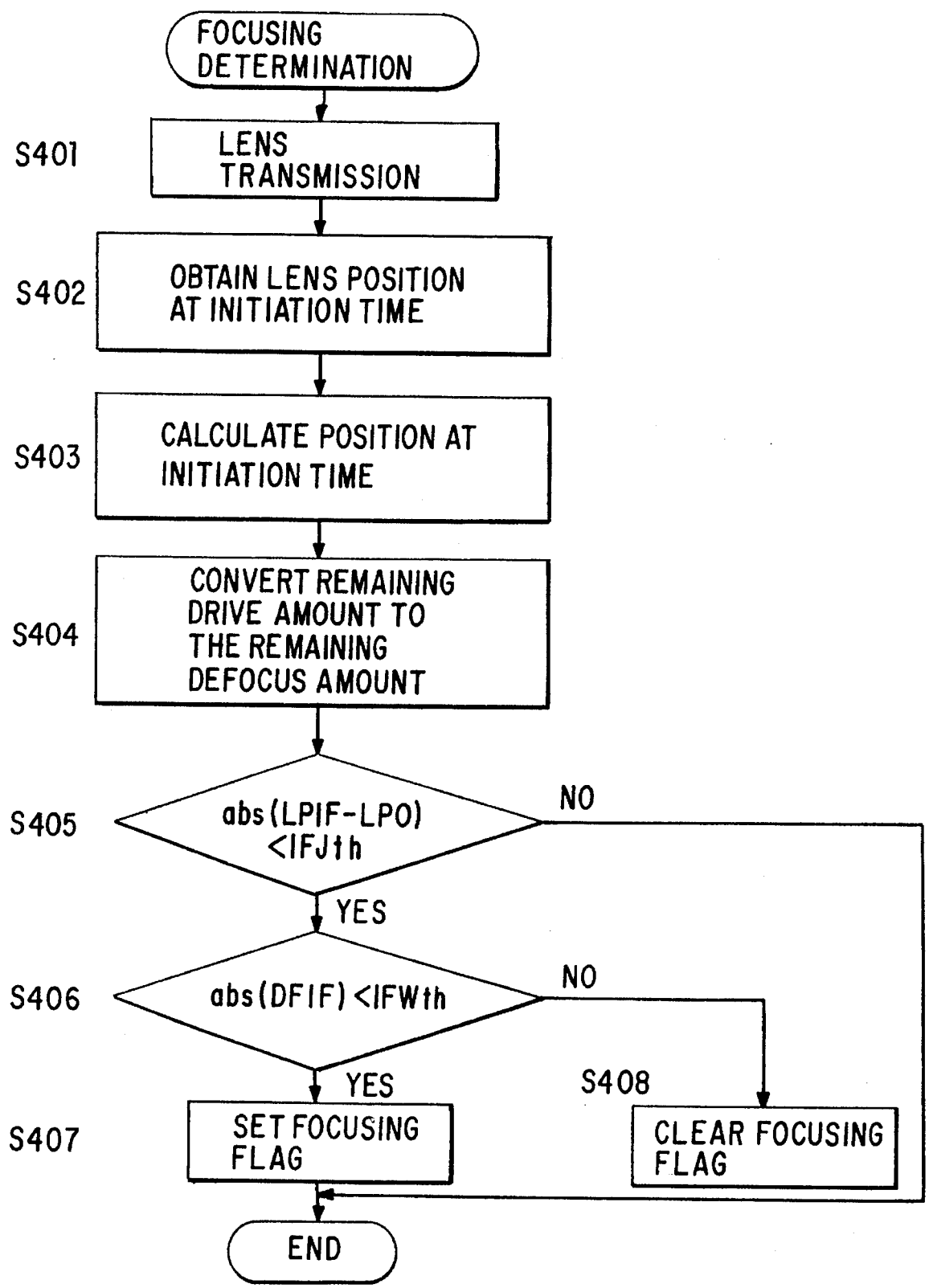
FIG. 10 is the flow chart of the subroutine used for focusing determination.
Figure 11:
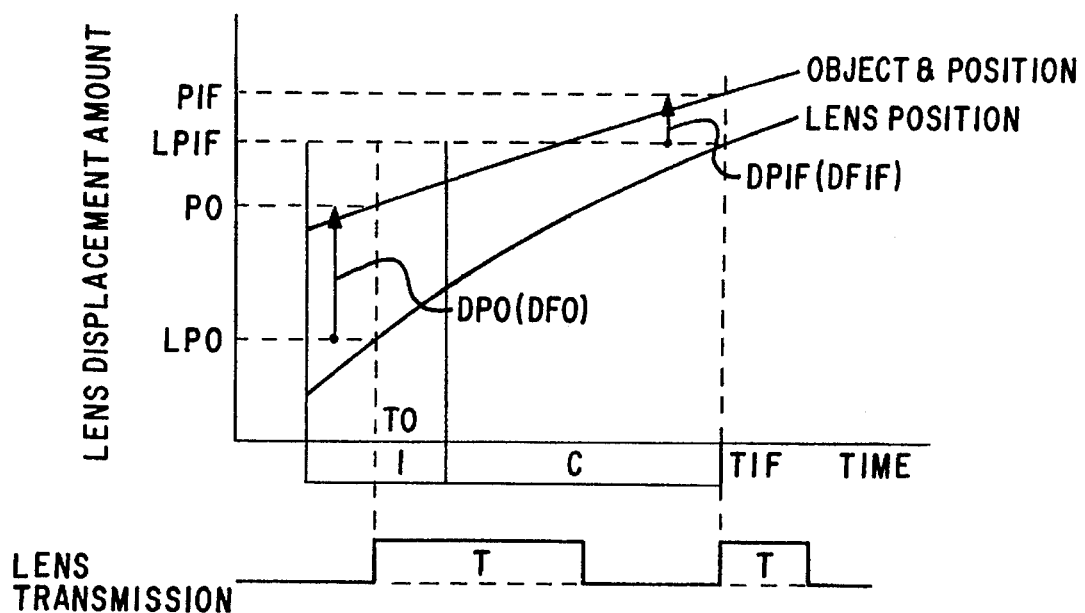
FIG. 11 is a graph illustrating the focusing determination.

Next, the focus determination sub-routine 108 will be explained. The sub-routine of the focus determination is shown in FIG. 10, and FIG. 11 shows the calculation of the defocus amount DFIF used when making a determination. In FIG. 11, the signal "T" in the line labelled "lens transmission" shows the exchange of data between the body lens from the lens transmission. The "I" symbol shows the storage of the photoelectric conversion elements, and shows the time of the focus detection calculation. In S401, in order to calculate the defocus amount to determine the focusing, the defocus amount-lens movement amount change coefficient is obtained through the lens transmission. This is done because it is possible to use a lens for which the defocus amount-lens movement amount change coefficient varies depending on the lens position.

At S402, the lens position LPIF of the initiation time of the lens transmission is obtained. This quantity is necessary in order to calculate the defocus amount DFIF (the defocus amount of the initiation time of the lens transmission) of the focusing determination time.

At S403, the object position PIF at the initiation time of the lens transmission is calculated by the following formula (11).

$$PIF=VP0\times(TIF-T0)+P0 \quad (11)$$

The TIF in this formula (11) represents the point of time of the initiation of the lens transmission of S401. S404 calculates the remaining drive amount DPIF of the focusing determination time by the following formula (12).

$$DPIF=PIF-LPIF \quad (12)$$

The defocus amount DFIF of the focus determination is calculated by the following formula (13) using the defocus amount-lens drive amount conversion coefficient obtained by the lens transmission of S401 and the remaining drive amount DPIF of the initiation time of the lens transmission.

$$DFIF=DPIF/(KB\times KL+DPIF\times L) \quad (13)$$

At S405 the movement amount of the lens from the present median storage time to the focusing determination time is examined to determine if it is below the prescribed value IFJth. This step is performed where the movement of the lens is large and there is an incorrect focus determination due to the calculation error. Therefore, for cases where lens movement is larger than the prescribed value, the focusing determination is not performed at this point.

S406 determines whether the defocus amount DFIF of the focusing determination time is within the allowable focusing width. For cases in which the focusing determination time is within the allowable width, the program proceeds to S407 and sets the focusing flag. For other cases, the program proceeds to S408 and clears the focusing flag.

Figure 12:
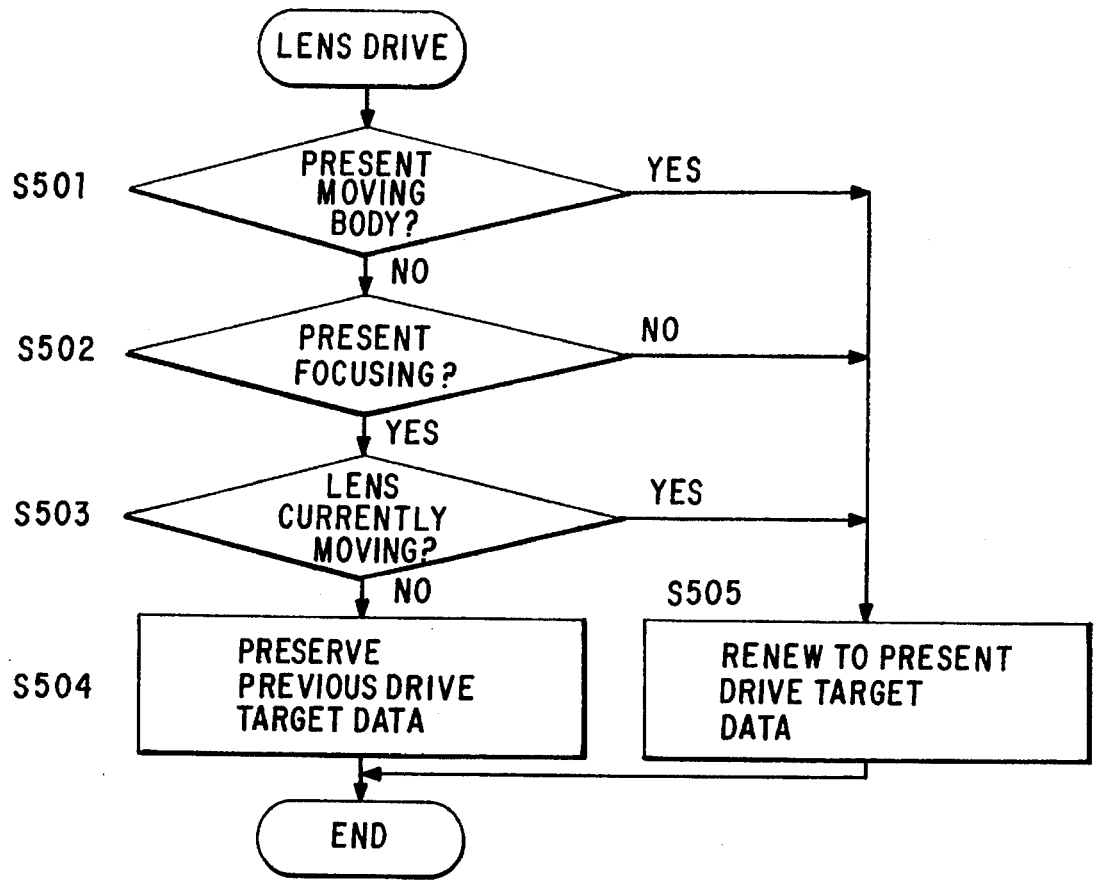
FIG. 12 is the flow chart of the sub-routine of the lens drive.

Next, the sub-routine of the lens drive S109 as shown in FIG. 12 will be explained.

S501 tests by way of the moving body flag whether a determination of a present moving body is to be made. For cases where a present moving body is detected, the lens movement does not stop due to the focusing determination. Therefore, the lens movement is renewed to the present calculated drive target data. In this instance, the drive target data is the object position P0 of the present median storage time and the lens movement target velocity VP0 of that time.

S502 is executed in the case where the determination of no present moving body is made. In the case where the determination is made for present focusing, renewal to the present calculated drive target data is accomplished. In the case where focusing is occurring, the program proceeds to S503.

The determination of whether the lens is presently moving takes place at S503. In the case where the lens is in the process of moving, its movement is renewed to the present calculated drive target data. In the case where the lens is presently driving, even if it is within the focus width, it will drive without stopping to a position where the defocus amount is 0. In the case where it is presently not driving, a new lens drive will not be performed. Therefore, the storage circuit 8 will preserve the previous drive target data without renewing to the present drive target data.

Figure 13:
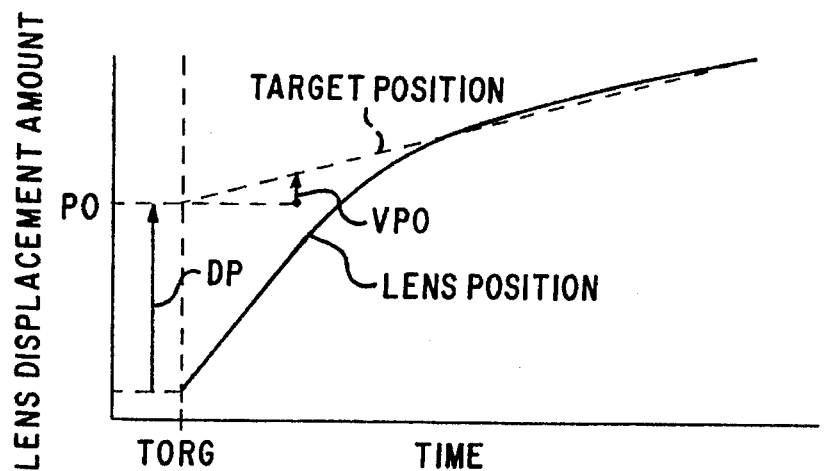
FIG. 13 is a graph illustrating the sub-routine of the lens drive.

At S505 the target data of the lens drive are set to the presently calculated value, the lens drive being driven according to the set drive target data. The lens drive is controlled to follow the straight line of the target position as in FIG. 13 using the standard point of time Torg and the object position P0 at that time, and the lens movement target velocity VP0. The DP in FIG. 13 shows the lens drive amount at the standard point of time Torg.

Figure 1:
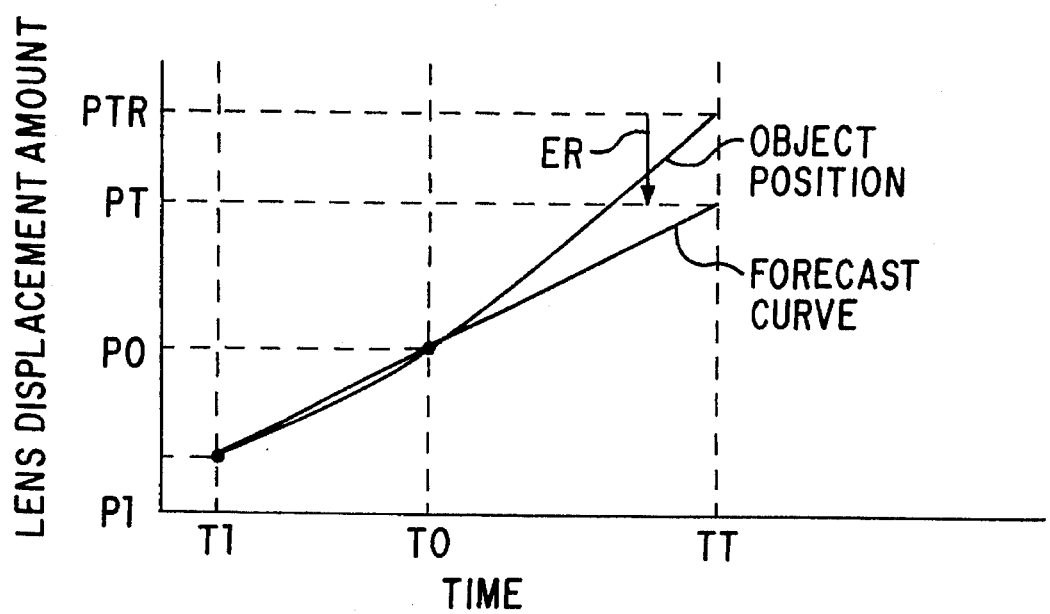
FIG. 1 illustrates the object position forecast by the prior art method that employs a linear formula.
Figure 2:
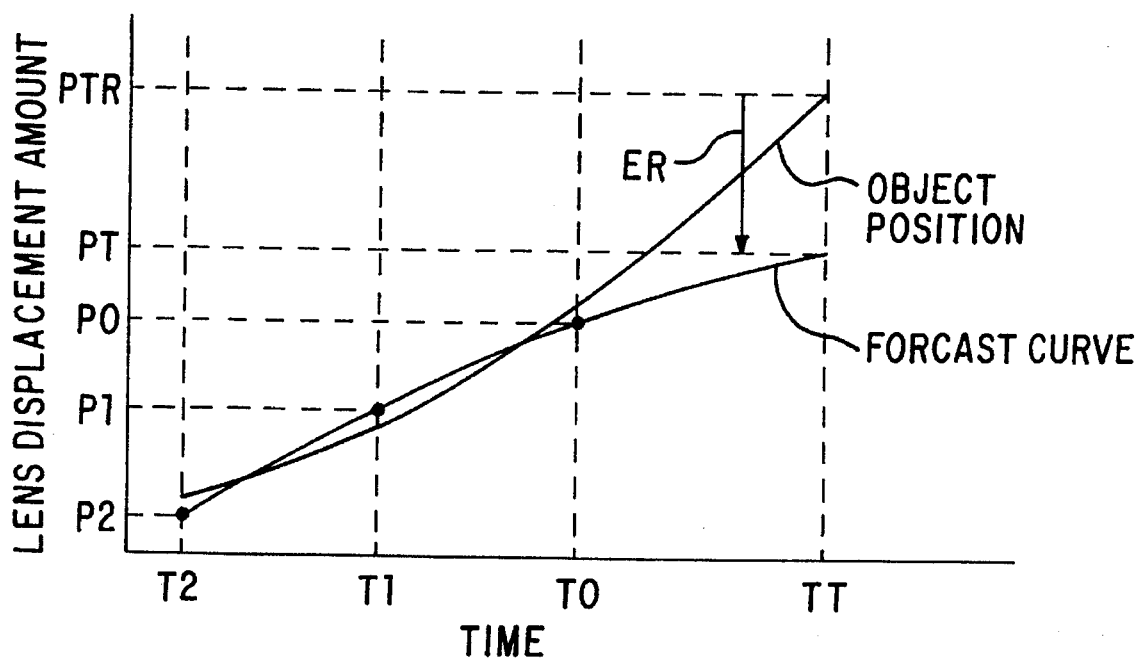
FIG. 2 illustrates the-object position forecast by the prior are method that employs a quadratic formula.

An explanation is provided hereafter of the second embodiment of the present invention with reference to FIG. 2 using the explanation of the prior art.

A case in which the present invention applies to a quadratic formula is explained hereafter. Using the object positions P0, P1, P2 at the times T0, T1, T2, each coefficient A, B, C of the following formula (14) will be calculated.

$$Ax_t^2+Bx_t+C \quad (14)$$

The velocity V1 between the time T0 and the time T1 is derived by way of the following formula (15).

$$V1=(P0-P1)/(T0-T1) \quad (15)$$

In the same way, the velocity V2 between the time T2 and the time T1 is derived. The quadratic coefficient A using the velocity V1, V2 is revised according to the following formula (16).

$$A=A\times(V1/V2) \quad (16)$$

Figure 14:
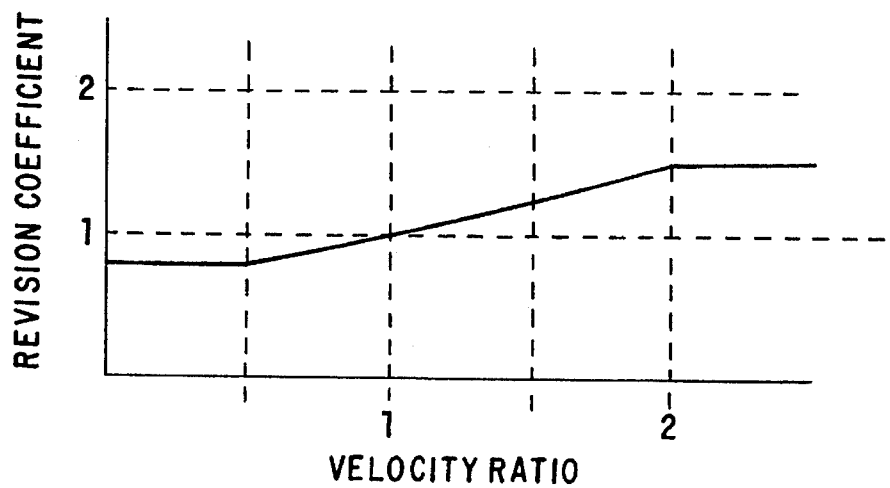
FIG. 14 is a graph illustrating the relationship between the velocity ratio and the revision coefficient of the second embodiment.

The future position based on each of the derived coefficients is forecast. In this embodiment, the quadratic coefficient A was revised directly by the velocity ratio. However, since revision is already added slightly due to the velocity ratio in the original coefficient A, the velocity can also be revised as in the following formula (17) where the newly revised coefficient VH is calculated from the velocity ratio as in FIG. 14.

$$A=A\times VH \quad (17)$$

Next, an explanation is provided of the third embodiment of the present invention.

In the case where the velocity ratio was calculated in the primary embodiment, the time interval used to calculate the velocities of the previous time and the present time were not considered. Therefore, the revision is different for cases where the time interval is long and cases where it is short.

Accordingly, the velocity ratio is standardized by means of a time interval used for calculating the velocity ratio. In other words, the formula (8) in the primary embodiment is modified according to the following formula (18).

$$AP = AP \times (SP0/SP1)/(100/(T0-T1)) \qquad (18)$$

For standardization, the ratio of the time interval used to calculate the standard time interval 100 ms and the velocity ratio is used. Accordingly, the standard time interval is 100 ms, but it is not particularly restricted to this value.

The following example is provided for this embodiment of the present invention.

When the velocity ratio is larger than the prescribed value SVth2, no revision of the object focusing position change acceleration AP due to the velocity ratio is performed. If the principal object is away from the AF area, the large velocity ratio occurs. Since an incorrect object focusing position change acceleration is calculated when revising the acceleration component by this velocity ratio, the revision is not performed. The revision is not performed for the case where the velocity ratio is larger than the prescribed value SVth2.

Figure 15:
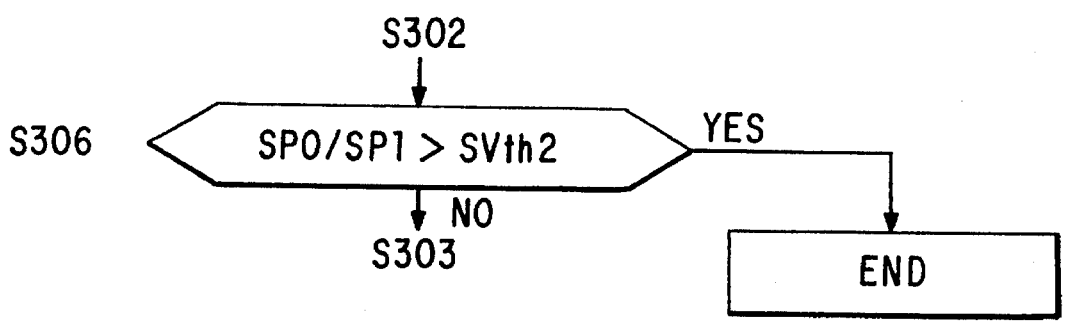
FIG. 15 is the flow chart of the subroutine for the moderation example.

A flow chart of this embodiment is shown in FIG. 15. At S306 the velocity ratio is tested to determine if it is larger than the prescribed value SVth2, and since the acceleration revision is not performed in the case where it is larger, the sub-routine of the acceleration revision is complete. Since the acceleration revision is performed in the case where the velocity ratio is smaller than the prescribed value, then the program proceeds to S303 and performs the revision. Accordingly, the relationship between the prescribed value SVth using the forecast calculation and the prescribed calculation SVth2 is SVth2≦SVth.

As explained above, the automatic focusing device forecasts the future acceleration component using the ratio of the object focusing position change velocity, and forecasts the future position. Therefore, it can accurately derive the change in the future focusing position.

The automatic focusing device may prohibit the revision section from operating since when the object focusing position change velocity is smaller than the prescribed value, the error in the object focusing position change acceleration gets larger. In this manner, the forecast of the position of the future object does not have a large error.

The automatic focusing device may prohibit the operation the revision section since when the image plane movement velocity is smaller than the prescribed value, the error in the object focusing position change acceleration gets larger. In this manner, the forecast of the position of the future object does not have a large error.

The automatic focusing device is further capable of prohibiting the operation of the revision section since there is a possibility of detecting a different object when the object focusing position change velocity is greater than the prescribed value. In this manner, the forecast of the position of the future object does not have a large error.

The automatic focusing device is capable of revising the quadratic coefficient of the quadratic function according to the velocity ratio of the object focusing position change velocity ratio calculation section. In this manner, the change of the future focusing position can accurately be derived.

The automatic focusing device is also capable of prohibiting the operation of the revision section since there is a possibility of detecting a different object when the object focusing position change velocity is greater than the prescribed value. In this manner, the forecast of the position of the future object does not have a large error.

While advantageous embodiments have been chosen to illustrate the invention, it will be understood by those skilled in the art that various changes and modifications can be made therein without departing from the scope of the invention as defined in the appended claims.

What is claimed:

1. An auto-focus adjustment device comprising:
   a focus detecting section that repeatedly detects a focus state of a photo lens;
   a moving velocity determining section that determines at least a first velocity and a second velocity related to the movement of an object based on the focus states detected by said focus detecting section;
   an acceleration determining section that determines an acceleration of the object based on the first velocity and second velocity determined by said moving velocity determining section;
   a velocity ratio determining device that determines a velocity ratio for the object based on the determined velocities from said moving velocity determining section; and
   a forecast section that forecasts a position of the object based on the determined velocities, the velocity ratio, and the acceleration.

2. The auto focus adjustment device of claim 1, wherein the at least first velocity and second velocity related to the movement of the object is image plane movement velocity.

3. The auto focus adjustment device of claim 1, wherein the at least first and second velocity related to the movement of the object is the displacement velocity of the photo lens.

4. The auto focus adjustment device of claim 1, wherein the forecast section forecasts the position while the object is moving.

5. The auto focus adjustment device of claim 1, wherein the forecast section forecasts the position when the object has stopped moving.

6. An automatic focusing device in a camera having a photographic lens comprising:
   focus detection means for detecting a focal adjustment state of the photographic lens;
   monitor means for monitoring movement of the photographic lens;
   object focusing position change velocity determining means for sequentially calculating at least two object focusing position change velocities of an object based on results from said monitor means and said focus state detection means;
   object focusing position change velocity ratio determining means for determining the ratio of two of the at least two object focusing position change velocities determined by said object focusing position change velocity determining means;
   object focusing position change acceleration determining means for determining an object focusing position change acceleration from two of the at least two object focusing position change velocities;
   forecast means for forecasting future movement of the object based at least on the determined velocities;
   revision means for revising the acceleration determined by the object focusing position change acceleration determining means according to the velocity ratio of the object focusing position change velocity ratio determining means when a predetermined condition is satisfied; and
   forecast control means for controlling the forecast means based on the object focusing position change acceleration revised by said revision means.

7. The automatic focus device of claim 6, wherein said predetermined condition is not satisfied when the object focusing position change velocity is below a prescribed value.

8. The automatic focusing device of claim 6, wherein the object focusing position change velocity is based on the image plane movement velocity.

9. The automatic focusing device of claim 6, wherein said predetermined condition is not satisfied when the object focusing position change velocity is above a prescribed value.

10. The automatic focusing device of claim 6, wherein said forecast means derives the object position after the prescribed time by a quadratic function, said object focusing position change velocity ratio determining means determines the ratio of the two object focusing position change velocities and sequentially calculates the object focusing position change velocities from the monitor results of the monitor means and the detection results of the focus detection means, and said revision means revises a quadratic coefficient of the quadratic function using the forecast means according to the velocity ratio of the object focusing position change velocity ratio determining means.

11. The automatic focusing device of claim 6, wherein the revision means does not operate when the object focusing position change velocity is above a prescribed value.

12. The auto focus adjustment device of claim 6, wherein the at least two object focusing position change velocities are the displacement velocities of the photo lens.

13. An automatic focusing method comprising:
   detecting the focal adjustment state of a photographic lens;
   monitoring the movement of the photographic lens;
   sequentially calculating at least two object focusing position change velocities of a moving object based on detection and monitoring results;
   calculating the ratio of two of the at least two calculated object focusing position change velocities;
   calculating the object focusing position change acceleration from the object focusing position change velocities;
   forecasting future movement of the object;
   revising the calculated acceleration according to the velocity ratio if a predetermined condition is satisfied; and
   controlling the forecast means based on the revised object focusing position change acceleration.

14. The automatic focusing method of claim 13, wherein the predetermined condition is not met if the object focusing position change velocity is below a prescribed value.

15. The automatic focusing method of claim 13, wherein the predetermined condition is not met if the object focusing position change velocity based on the image plane movement velocity falls below a prescribed value.

16. The automatic focusing method of claim 13, wherein the predetermined condition is not met if the object focusing position change velocity is above a prescribed value.

17. The automatic focusing method of claim 13, wherein said forecasting step derives by quadratic function the object position after the prescribed time, said calculating step calculates the ratio of two of the at least two object focusing position change velocities and sequentially calculates the object focusing position change velocity from the monitor results and the detection results, and said revision step revises a quadratic coefficient of the quadratic function according to the velocity ratio.

18. The automatic focusing device of claim 17, wherein the predetermined condition is not met when the object focusing position change velocity is above a prescribed value.

19. An auto-focus adjustment method comprising:
   repeatedly detecting the focus conforming state of a photo lens;
   calculating at least a first velocity and a second velocity related to the movement of an object based on the focus conforming state;
   calculating an acceleration of the object based on the first velocity and second velocity;
   determining a velocity ratio of the object based on the first and second velocities; and
   forecasting a position of the object based on the velocities, the velocity ratio, and the acceleration.

20. The auto focus adjustment method of claim 19, wherein the velocity related to the movement of the object is the image plane movement velocity.

21. The auto focus adjustment method of claim 19, wherein the velocity related to the movement of the object is the displacement velocity of the photo lens.

22. The auto focus adjustment method of claim 19, wherein the forecasting step forecasts the position while the object is moving.

23. The auto focus adjustment method of claim 19, wherein the forecasting step forecasts the position when the object has stopped moving.

* * * * *